June 1, 1971  S. R. BENIGNO  3,582,430
METHOD AND APPARATUS FOR BONDING FOAM PLASTIC TO A BACKING
Filed Oct. 21, 1965  2 Sheets-Sheet 1

INVENTOR
Sam R. Benigno
BY
Pearson + Pearson
ATTORNEY

June 1, 1971 S. R. BENIGNO 3,582,430
METHOD AND APPARATUS FOR BONDING FOAM PLASTIC TO A BACKING
Filed Oct. 21, 1965 2 Sheets-Sheet 2

INVENTOR
Sam R. Benigno
BY
Pearson + Pearson
ATTORNEY

United States Patent Office 3,582,430
Patented June 1, 1971

3,582,430
METHOD AND APPARATUS FOR BONDING FOAM PLASTIC TO A BACKING
Sam R. Benigno, 19 Woekel Terrace,
Methuen, Mass. 01844
Filed Oct. 21, 1965, Ser. No. 500,006
Int. Cl. C09j 5/06; B32b 31/26
U.S. Cl. 156—322                                                13 Claims

ABSTRACT OF THE DISCLOSURE

A pair of rolls are rotatable in horizontal, pressure nip, relationship. A backing web and a foam plastic web are introduced upwardly into the nip but spaced apart just below, and in advance of the nip to form an upwardly convergent throat. A heater, mounted below the nip within the throat, directs heat upwardly against the surface of the foam so that it will be bonded to the backing in the nip. The heater can be swung to also pre-heat the backing web. Suction is applied to the throat to remove the gases of combustion.

---

Figure 1:
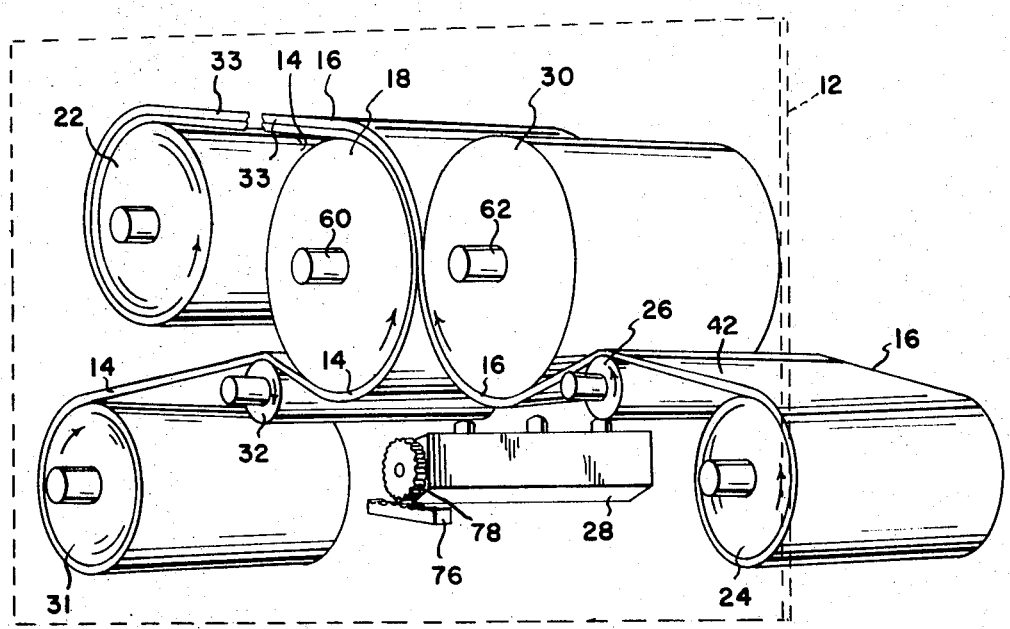

The present invention relates to a method for bonding a sheet of foamed elastic material formed of a polymer like polyurethane to a sheet of a backing material such as paper, cloth or the like to form a laminate.

It has been known in the art for some time that sheets of an elastic flexible foamed material such as polyurethane foam could be bonded to sheets of relatively inelastic backing materials under certain processing conditions both with and without the use of adhesives. However, the methods suggested in the art for avoiding the use of adhesives thus far have had a number of drawbacks. One drawback has been the necessity of maintaining a relatively clean plant with air substantially free of lint and other such matter which is so common in web processing plants.

Another problem is to assure the proper temperature of each of the two sheets being laminated. Satisfactory solution of this problem has heretofore required a plurality of heaters.

Those prior art processes requiring the use of adhesives are not favored because products of such processes are not sufficiently resistant to delamination by attack from dry-cleaning solvents, are not desirably resilient, and are subject to delamination caused by weakening of the adhesives by mildew and other such deteriorating processes. Therefore, the aforementioned processes which dispense with the use of adhesives are, for most purposes, becoming the favored methods of manufacturing laminates comprised of a relatively inelastic backing and a relatively elastic foamed sheet of synthetic polymer.

Such laminated foam-to-backing structures are becoming increasingly preferred materials for use in insulated clothing, upholstery coverings, carpet cushioning and numerous other uses wherein it is desirable to combine insulating properties contributed by the gas-entrapping foam and the easy-cleaning properties of a plastic surface. Among the most preferred synthetic plastic materials which may be used in these applications is polyurethane of the polyester type. The mechanical properties of this foam and the relatively low friction coefficients between polyurethane and fabrics have been important considerations in the aforesaid applications.

Therefore, it is an object of the present invention to provide means for joining flexible and elastic foamed material, such as polyurethane foamed sheet and the like, to relatively inelastic backings, or any other suitable backing material.

It is a further object of the invention to develop a laminating process which requires removal of less waste heat than those known to the art.

It is another object of the invention to provide a novel method and apparatus for maintaining a desirable temperature differential between the relatively elastic foamed sheet and its backing sheet at the time they are bonded to form a laminate.

It is a still further object of the invention to provide a laminating process which may be successfully operated in lint-contaminated areas.

Other objects of the invention will be obvious on reading that portion of the specification included hereinafter.

A still further object of the invention is to provide a process for laminating a plastic foam and a backing therefor which process utilizes a single heater unit for both heat bonding and pre-heating, if desired.

Another object of the invention is to provide an apparatus and method for laminating a plastic foam web to a backing web, in the downwardly flaring throat of the nip of a pair of pressure rolls, or to so laminate a plastic foam web between a pair of backing webs, while providing means for continuously controlling and removing hot gases from the apex of the throat at the nip, thereby avoiding discoloration of light colored fabrics and avoiding an undesirably high temperature at the nip.

Another object of the invention is to provide in such an apparatus and method, power operated means for controlling the nip clearance of the pressure rolls, so that the nip clearance is always less than the total thickness of the two or more webs being laminated to firmly press the webs into adhering engagement.

Another object of the invention is to provide in such an apparatus means for controlling and varying the nip pressure on the webs, the direction of the heat relative to the nip and the negative pressure withdrawing hot gases from the nip, whereby various materials of various thicknesses may be heat laminated and whereby an outer layer, or film, of the plastic foam may be intentionally removed to reduce the thickness thereof, if desired.

The aforementioned objects have been substantially achieved by a novel process whereby the backing sheet and plastic foamed sheet are fed upwardly into the nip of a pair of pressure rolls while the plastic foamed sheet is being heated from below by a single heating unit.

The process of the invention is entirely suitable for the production of strongly bonded laminates having few or no blisters resulting from the formation of wrinkles during the manufacturing operation or by later permeation of air into areas where the relatively elastic foamed material and the backing sheet have not been brought into sufficiently intimate contact to assure bonding therebetween. Furthermore, because the foamed sheet does not face upwardly at any time between its being heated and being formed into a laminate, there is little or no opportunity for lint or other droppings to come into contact with the adhesive surface of the foamed sheet.

In the specification and in the accompanying drawing is described and shown an illustrative embodiment of the present invention; modifications thereof are indicated, but it is to be understood that these are not intended to be exhaustive nor limiting of the invention, but on the contrary are given for purposes of illustration in order that others skilled in the art may fully understand the invention and the manner of applying it in practical applications.

Figure 2:
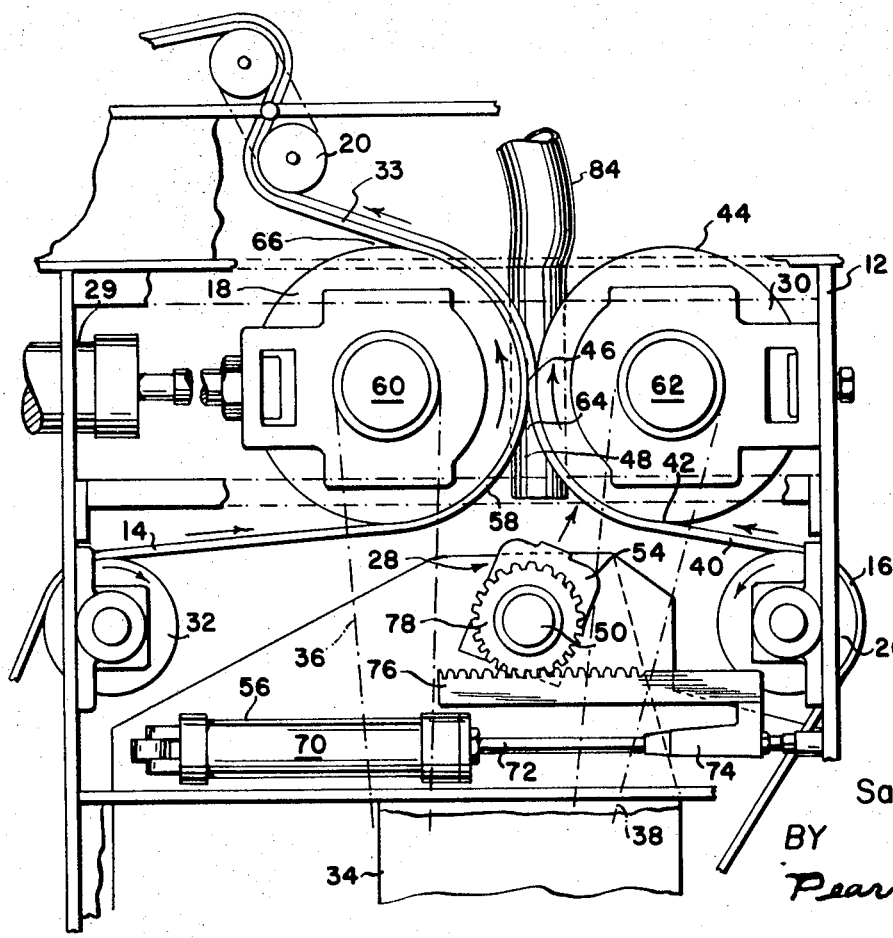
Figure 3:
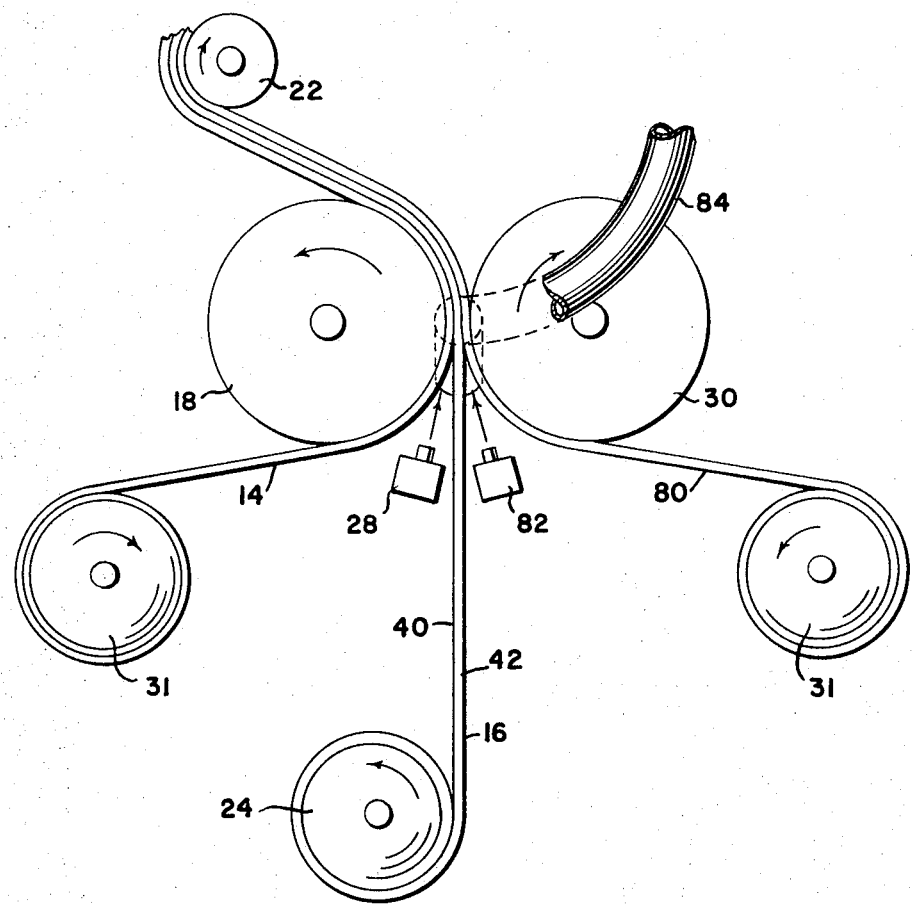

The various objects, aspects, and advantages of the present invention will be more fully understood from a consideration of the specification in conjunction with the accompanying drawings, in which:

FIG. 1 is a schematic perspective view in elevation of the apparatus of the invention, FIG. 2 is a side elevation of the apparatus of the invention, and FIG. 3 shows a side elevation of the apparatus of the invention, similar to that shown in FIG. 2, whereon a double lamination may be achieved.

Referring to FIGS. 1 and 2, it is seen that the apparatus of the invention is mounted upon support structure 12 in such a way that backing cloth sheet 14 and foamed sheet 16 are both carried into contacting position on backing roll 18 and thence carried under tension device 20 onto wind up roll 22.

More particularly, foamed sheet 16 is stored on foamed supply roll 24 for travel over idler roll 26, over heater 28 and into contact with nip roll 30, which is preferably a chill roll, before being brought into contact with cloth backing sheet 14 at backing roll 18.

Simultaneously, backing cloth sheet 14 is unwound from the backing cloth sheet supply roll 31 over idler roll 32 and thence over backing roll 18. Controlled, uniform, squeezing pressure is exerted by fluid pressure means 29 to urge movable roll 18 toward fixed roll 30 to maintain predetermined nip pressure on the foamed and cloth sheets travelling therebetween. The force by which the webs are maintained in adhering contact with one another during stabilization is supplied by the tension under which each sheet is maintained by tension means 20, and by which each sheet is pulled taut against backing roll 18 as the laminated product 33 travels around about one quadrant of the roll 18.

The sheet, or web, motivating means of the invention includes the conventional wind-up roll mechanism and includes suitable means such as electric motor drive 34 and power connections 36 and 38 for driving rolls 18 and 30 at the same surface speeds.

Heating element 28 is placed beneath plastic foamed sheet 16 at a position opposite nip roll 30.

The wind-up roll 22, supply rolls, the cloth backing sheet, and the foamed sheet are kept under constant tension by devices not shown but which may be selected from many devices suitable for maintaining such tension, which devices are well known in the web processing arts.

In operation, a sheet of plastic foam 16 is unwound from foamed supply roll 24 and carried over idler roll 26 which roll 26 aids in smoothing and tracking foamed sheet 16. Thereupon foamed sheet 16 is carried over gas-flame heater 28. Radiant heat and convectional heat from heater 28 travel in an upward direction and cause the downwardly facing surface of plastic foamed sheet 16 to become soft and sufficiently adhesive in nature to be joined to cloth sheet 14. At the same time that the downwardly-facing side 40 of sheet 16 is being heated, nip roll 30 is in contact with the upwardly-facing side 42 of sheet 16, and roll 30 may be chilled to assure against an overheating of the foam in such a way as to degrade its insulating properties, to cause it to adhere to the roll face 44 or to modify its mechanical properties and thereby interfere with the smooth processing of sheet 16.

It is advantageous that plastic foamed sheet 16 be kept in contact with nip roll 30 for approximately 90° of circumferential travel thereof.

Immediately after passage of foamed sheet 16 past nip roll 30, it is pressed against cloth sheet 14 in pressure nip 46 which is at the apex of the tapered, upwardly-converging, downwardly-diverging entrance throat 48. In a manner similar to that which foamed sheet 16 has been transported from foamed supply roll 24, backing cloth 14 has been carried from cloth supply roll 30 over idler roll 32, and, under tension, into contact with backing roll 18. Thus, it is against cloth sheet 14 that foamed sheet 16 is brought into direct contact as it starts its curved path around backing roll 18. Cloth sheet 14 and foamed sheet 16 adhere together on contact, and the heated plastic cools to stabilization in the approximately 90° travel around roll 18 and during its travel to the wind-up roll 22.

The cloth web 14 underlies the foam web 16 on roll 18, thereby eliminating any possibility of adhesion of the heated foam to the roll 18 and eliminating any need for chilling roll 18.

Heater 28 is mounted on pivot 50 whereby it can be aimed for heating only the foamed sheet or both foamed sheet and backing sheet.

The entrance throat 48 is formed by the adjacent faces of roll 30 and roll 18, with the rolls preferably being of equal diameter, as shown, and both driven at the same surface speed.

As shown in FIG. 2, the heater 28 is angularly movable on pivot 50 in brackets 54 for automatic movement to various angular positions by hydraulic means 56. The heater 28 not only directs a transversely extending band of intense heat at the underface 40 of foam web 16, but by reason of its upward facing position within the throat 48, causes the hot combustion gases to move upwardly by convection with the underface 40 to the nip 46 and to collect in the nip to thereby assist in melting the foam to the desired temperature of adhesion. The hot gases cannot cause bubbling in the laminate product 33 because they are squeezed out at the pressure nip 46 and forced to pass upwardly from the opposite ends of the throat. By careful adjustment of the angle of the heater 28, these hot gases in the throat can be used to pre-heat the adjacent face 58 of the web 14, more or less, depending on the characteristics of the web 14. The back-up roll 18 rotates on a horizontal axis formed by shaft 60, and the nip roll 18 rotates in parallelism therewith on shaft 62. The apex 64 of throat 48, and the pressure nip 46, are thus at one side of the axis of roll 18, to cause the laminated product 33 to travel around about one quadrant, or 90° angular distance, of the upper portion of roll 18, whence the produce leaves the roll 18 at the top 66 thereof, to travel to wind-up roll 22.

Hydraulic or air means 56 includes the cylinder 70, piston 62, pivoted link 74, gear rack 76, and spur gear 78, whereby linear motion of the piston is converted to desired angular motion of heater 28.

Heater 28 may be of several types. For example, a direct gas-fired heater has been used most satisfactorily for heating of the plastic foamed sheet by combustion gases therefrom to achieve the advantages of the invention, with the flame carefully controlled to avoid underheating or overheating the surface of foamed sheet 16. The use of such a direct gas-fired heater achieves the desired effect on the plastic foam and does so more advantageously than use of a heater aimed at the top of the foam because direct impingement of the flame, and the consequent risk of deteriorating the foam web's surface, is avoided. The convection of the combustion gases and air heated thereby to the foamed web provide sufficient heat so that the flame need not be brought onto the surface of the sheet.

Infrared heaters, or radiant infrared heaters, may also be used to achieve the object of the invention. Infrared lamp heaters may cause excessive penetration of heat through the foam but tend to avoid the problems associated with removal of combustion gases. When properly controlled, such lamps may provide an efficient method of heating plastic foam to an adhesive state, especially when a specific area, or pattern of the web is to be heated. Direct gas flame, or gas-fired infrared heaters, are preferred, however, when a narrow band of intense heat is desired.

Idler rolls 32 and 26 may be of the straight-axle type or may be slightly curved as is known to the art for the more efficient removal of any wrinkles which appear in the cloth and foamed web.

FIG. 3 shows apparatus similar to that shown in FIG. 2 except that a double laminate is prepared by heating a second backing sheet 80 with a second heater 82 and bringing sheet 80 into contact with foam sheet 16. Exhaust ducts 84 are positioned immediately adjacent the nip between rolls 30 and 18 to provide means for removing any gaseous products formed on the heating of the foam product. Such gaseous products are preferably removed because they can contribute to discoloration of white laminates. This is true, of course, whether a single or double lamination is being formed.

The supply rolls, idler rolls, and wind-up rolls may be constructed of any of the materials of construction known to the art to be useful for such construction.

The nip clearance between rolls 18 and 30 is yieldably maintained by the air pressure exerted by means 29, the pressure being so controlled as to maintain the nip at a clearance less than the total thickness of the webs being laminated in the nip, thereby assuring that the laminates are pressed into adhering engagement and that a product of the desired overall thickness is achieved.

Regardless of the relative diameter of the nip rolls 18 and 30, the rolls are rotated at the same surface speed, although preferably rolls 18 and 30 are of identical diameter.

The nip rolls 18 and 30 may also be so constructed, but some prefer to cover such rolls with a material resistant to adherence to sticky materials. One such material which is becoming increasingly accepted in the art is polytetrafluoroethylene such as that sold under the trade name, Teflon, by E. I. du Pont de Nemours and Company. This material can be coated onto metal rolls in thin layers. Such a method of application is particularly recommended for the roll 30, if chilled, in order to minimize the loss of heat conduction which will result from use of a plastic material as a surface therefor.

As will be obvious to those skilled in the art, all of the aforementioned rolls such as idler rolls, supply rolls, chilling rolls and backing rolls are suitably mounted on horizontal shafts which are journalled between frame members of support structure 12.

The method by which roll 30 is cooled is not of particular criticality except that sufficiently cool water should be used to obtain the desired protective effect. Water of 35 to 55° F. is entirely suitable.

Edge-cutting and tracking devices conventionally used in the plastic, textile and paper industries are suitable for use with the apparatus of the invention and may be selected by those skilled in the art. These apparatus have not been included in the drawing in order to maintain clarity and simplicity in disclosing the invention and because a further description of such apparatus is not essential to describe practice of the invention to those skilled in the art.

What is claimed is:

1. A method for bonding a foam plastic web to a fabric backing web by means of a pair of horizontally disposed, pressure nip rolls, said method comprising the steps of
   yieldably maintaining the clearance of the nip of said rolls at slightly less than the total thickness of said webs and rotating said rolls at the same surface speed;
   introducing said backing web upwardly into said nip, guiding said web around about one upper quadrant of one of said rolls, and then guiding said web away from said roll;
   Spacing said foam plastic web away from said backing web just in advance of said nip to form an upwardly convergent entrance throat, introducing said plastic web upwardly into said nip, and guiding said plastic web around the said quadrant of said roll in superposed position on said backing web;
   and applying a band of intense heat transversely across the underface of said foam plastic web in said upwardly convergent entrance throat to render the said underface adhesive for firm bonding with said backing web at said nip.

2. Apparatus for bonding a foamed plastic sheet to a backing sheet, said apparatus comprising
   a horizontal backing roll,
   a horizontal nip roll, rotating in parallelism alongside said backing roll to form a nip therebetween,
   means for supplying a plastic foamed sheet to the surface of said nip roll to travel upwardly through said nip,
   means for supplying a backing sheet to said backing roll, to travel upwardly through said nip, said sheet forming an upwardly converging throat with said foamed sheet,
   a heater mounted below said rolls, in said throat just in advance of said nip, said heater directing heat upwardly to said plastic foamed sheet,
   pressure applying means, associated with one of said rolls for urging the same toward the other roll under predetermined pressure, to cause said sheets to firmly adhere to each other as a laminate, and
   means for maintaining the clearance of said nip at slightly less than the total thickness of said sheets.

3. Apparatus as defined in claim 2 plus suction means on said apparatus, said means including suction ducts operable at each opposite end of said throat for removing hot gases therefrom.

4. Apparatus for bonding a plastic foamed material to a backing material, said apparatus comprising:
   a backing roll continuously rotating on a horizontal axis;
   a wind-up roll arranged to wind up material received from said backing roll under predetermined tension;
   backing web supply means continuously delivering a web of backing material upwardly to the surface of said backing roll, at one side of the axis thereof, to travel around at least one quadrant of the upper portion of said roll and away therefrom, to said wind-up roll;
   a nip roll, continuously rotating on a horizontal axis, and forming a pressure nip of predetermined clearance with said backing roll at said one side of the axis;
   plastic foamed web supply means continuously delivering a web of plastic foamed material upwardly into said nip onto the surface of said backing web, with the underface of said plastic foamed material overlying the upper face of said backing material web, to travel around the said quadrant of the upper portion of said roll and away therefrom, and therewith, to said wind-up roll;
   said foamed web and said backing web diverging away from each other in advance of said nip to form an upwardly convergent throat therebetween, and
   heating means operable in said throat for applying heat upwardly toward said underface of said plastic foamed material just in advance of said nip to soften said underface prior to contact with said backing web at the apex of said throat.

5. Apparatus as specified in claim 4, plus adjustable mechanism supporting said heating means in said throat to be fixed angularly in any one of a plurality of directions, ranging from a direction toward said foam web only to a direction toward said foam web but also toward said backing web to preheat the same.

6. Apparatus as specified in claim 4, plus adjustable pressure applying means operably connected to at least one of said back up or nip rolls for maintaining a predetermined nip pressure on said webs to press said webs firmly together.

7. Apparatus as specified in claim 4, wherein said backing roll and said nip roll are of substantially equal diameter, and wherein said apparatus includes drive means for rotating said backing roll and nip roll at the same surface speed.

8. Apparatus as specified in claim 4 plus suction means mounted on said apparatus, said means including at least one suction duct operable on at least one end of said throat to withdraw hot gasses therefrom.

9. Apparatus as specified in claim 4 wherein said backing web supply means includes means for delivering a second backing web to the said side of the axis of said backing roll to overlie the upper face of said plastic foamed material, and form a second upwardly convergent throat therebetween, said apparatus includes a second heating means operable in said second throat for applying heat to the said upper face of said plastic foamed material to soften the same prior to contact with said second backing web at the apex of said throat.

10. Apparatus for laminating a foam plastic web to a fabric backing web, each said web having a predetermined thickness, said apparatus comprising
- a pair of horizontally disposed rolls forming a nip therebetween, said nip having a predetermined clearance slightly less than the total thickness of said webs;
- wind-up roll means for drawing said webs upwardly through said nip and around at least one quadrant of one said roll with said foam web superposed on said backing web;
- web supply means for supplying said webs upwardly into said nip, with one said web spaced from the other to form an upwardly convergent tapered throat having an apex at said nip.
- and heating means mounted within said throat to direct heat upwardly against the adjacent underface of said foam web to render the same adhesive for bonding with said backing web at said nip.

11. Apparatus as specified in claim 10 wherein:
said heating means is a gas fired heater, mounted under said nip at a spaced distance from each said roll, to pivot through a predetermined angular distance; and includes power means for automatically pivoting said heater to a selected position for heating one, or both, of said webs.

12. Apparatus as specified in claim 10 plus suction means, including a suction duct operably connected to at least one end of said throat for withdrawing hot gaseous products from said throat in advance of said nip.

13. Apparatus as specified in claim 10 wherein:
one said nip forming roll is rotatable on a fixed horizontal axis and the other said roll is rotatable on a movable horizontal axis, and
said apparatus includes pressure applying means, operable on said other roll to maintain a predetermined pressure at said nip.

References Cited
UNITED STATES PATENTS

| | | | |
|---|---|---|---|
| 3,057,766 | 10/1962 | Dickey | 156—82 |
| 3,142,331 | 7/1964 | Dierks | 239—132.3 |
| 3,223,568 | 12/1965 | Alderfer | 156—255 |
| 3,239,399 | 3/1966 | King | 156—497X |
| 3,368,932 | 2/1968 | Weill et al. | 156—497 |
| 3,210,227 | 10/1965 | Schichman | 156—82 |

JOHN I. GOOLKASIAN, Primary Examiner

D. J. FRITSCH, Assistant Examiner

U.S. Cl. X.R.

156—82, 324, 497, 499